United States Patent Office 3,564,886
Patented Feb. 23, 1971

3,564,886
BULGING APPARATUS
Masanobu Nakamura, 22–8 Matsubara-cho, 5-chome,
Setagaya-ku, Tokyo, Japan
Filed Sept. 11, 1968, Ser. No. 759,189
Int. Cl. B21d 26/04
U.S. Cl. 72—62    4 Claims

ABSTRACT OF THE DISCLOSURE

An apparatus for radially bulging a tubular material by giving axial pressure from both ends of the tubular material by means of a pair of annular members which are slidably mounted in a cylindrical member of which one end is opened through which a pressure fluid is fed into the bore of the tubular material. When the pressure fluid is pumped into the bore of the tubular material, the pressure causes the tube to bulge and the annular members to move axially toward each other. Thus a single source of pressure works to bulge the tubular material as well as to reduce the length of the tube. By providing an additional annular member or members, a plurality of bulges may be formed on the tubular material.

This invention relates to a novel bulging apparatus.

More particularly the invention pertains to a bulging apparatus adapted to bulge a workpiece easily and smoothly within a period of time about half that required by conventional equipment and which can be extremely simplified in general construction, especially of its pressure-transmitting means.

These and other features and advantages of the present invention will be better understood from the following detailed description taken in connection with the accompanying drawings, in which.

Figure 5:
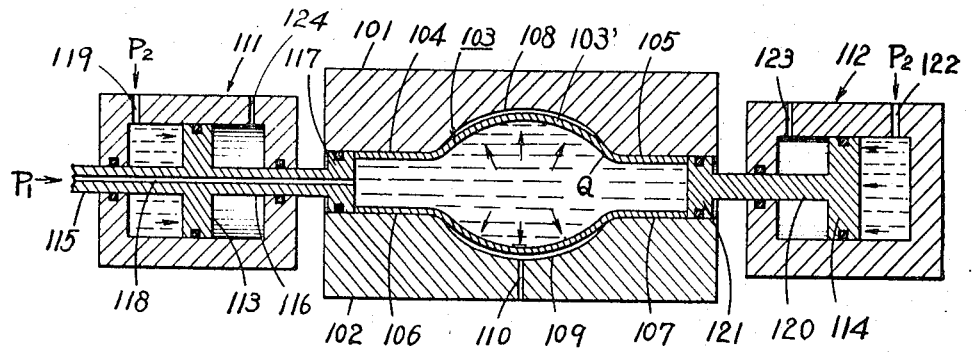
FIG. 5 is a diagrammatic front view, in vertical section, of an example of a conventional bulging apparatus.

Conventional bulging apparatus generally comprises a construction as illustrated in FIG. 5.

In the figure, reference numeral 101 indicates an upper mold member and 102, a lower mold member. The opposing faces of mold members 101, 102 are formed, on both end portions, with pairs of inner grooves 104, 105 and 106, 107, respectively, of semicircular cross section adapted to receive and sandwich a tubular workpiece 103 therebetween. Intermediate between the matching pairs of grooves there are provided cavities 108, 109 conforming to the dimensions and contours of the bulge to be formed on the tube. From the center of one cavity 109 a vent hole 110 is provided through the mold body for communication to the outside.

Between the matching pairs of grooves 104, 106 and 105, 107, respectively, of upper and lower mold members 101, 102, both ends of a tubular workpiece 103 are placed, and then the upper and lower mold members 101, 102 are closed together by suitable clamping means not shown.

Pressure-transmitting means at left and right as viewed in the figure are generally indicated at 111 and 112, respectively. They are horizontal cylinders with round cross sections and have pistons 113, 114 therein.

Rods 115, 116 are abutted to respective sides at the center of piston 113 of left pressure-transmitting means. Large-diameter head 117 formed at the front end of right rod 116 is extended into the mold in such way as to slide reciprocatingly along the matching grooves 104, 106. Throughout the lengths of rods 115, 116 there is provided an axial passage 118 for hydraulic oil, the leftmost end thereof being communicated with the source of primary hydraulic oil or pressure fluid $P_1$.

Cylinder of pressure-transmitting means 111 is provided with a hole 119 at the left of piston 113, which hole is communicated to the source of secondary pressure fluid $P_2$ and serves as a passage therefor, and is also provided with a vent hole 124 at the right of said piston 113.

Rod 120 is abutted solidly to the center of left side of piston in right cylinder 112. Large-diameter head 121 formed at the left end of said rod is inserted into the mold in such manner as to slide reciprocatingly along the matching pair of grooves 105, 107.

Cylinder 112 is formed with a hole 122 at the right of piston 114 for communication with the source of secondary pressure fluid $P_2$, and is also provided with a vent hole 123 at the left of piston 114.

Pistons 113, 114 are so designed as to have the same effective pressure-receiving areas for secondary pressure fluid.

In the apparatus of the construction above described, primary pressure fluid $P_1$ is pumped into tubular workpiece 103 and secondary pressure fluid $P_2$ into the spaces outwardly of pistons 113, 114 to apply pressures against both ends of workpiece 103 so that the intermediate portion of the tube can be increased in diameter to a bulged form as desired.

The pressure of secondary pressure fluid $P_2$ must be varied depending on the pressure of primary fluid $P_1$ to be charged in the tubular workpiece 103 and the variation of friction between the contacting faces of the work 103 and upper and lower mold members 101, 102 during molding operation. This pressure regulation requires considerable technical skill. In addition, the tube must be worked slowly over a lengthy period of time, while the pressure is being regulated, at a disadvantage.

Further, in the working with an apparatus of the conventional type as described, the friction between the corners Q at the root of each bulged portion 103′ of tube 103 and the internal faces of upper and lower mold portions is materially intensified. This may sometimes result in insufficient extension and even cracking of the bulge 103′.

Figure 1:
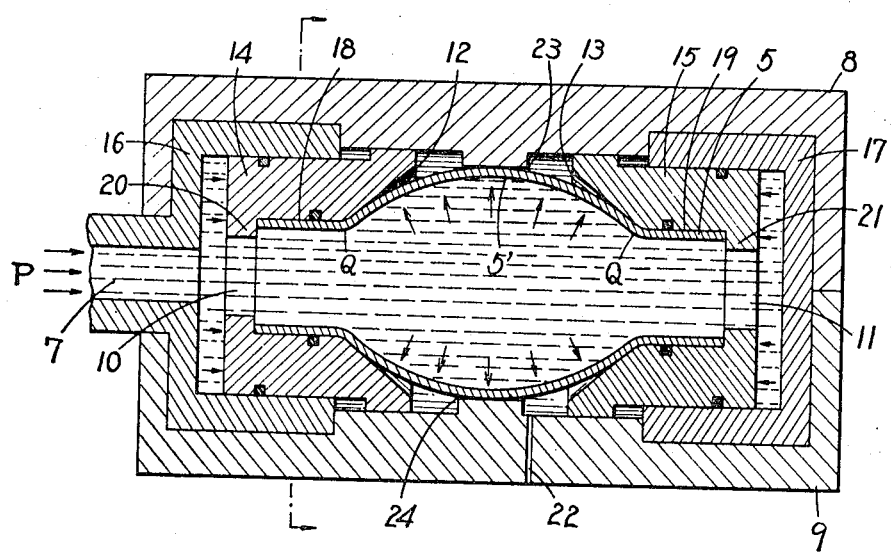
FIG. 1 is a diagrammatic front view, in vertical section, of an apparatus embodying the present invention.
Figure 2:
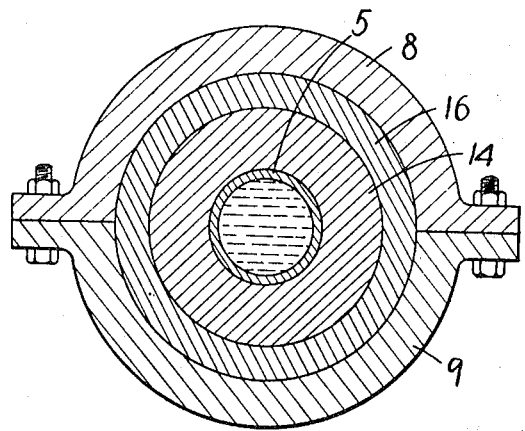
FIG. 2 is a side view, in cross section, taken along the line X—X of FIG. 1.

The present invention has for its object elimination of the foregoing disadvantages of conventional bulging apparatus. The invention will now be described in detail by reference to FIGS. 1 and 2 showing an embodiment thereof.

According to the invention, semicylindrical upper mold member 8 and lower mold member 9, each having a hole 7 for feeding hydraulic oil or pressure fluid P at one end and is closed at the other end, receive slidable annular members 14, 15, respectively, in the inner ends thereof, said annular members being provided with openings 10, 11 as passages for pressure fluid through the central portions and are formed with molding cavity faces 12, 13 which correspond in contours to the bulge to be obtained, and also with inner grooves 18, 19 adapted to receive tubular workpiece 5 at both ends. As pressure fluid is forced into the cavity defined between upper and lower mold members 8, 9 through hole 7, slidable annular member 14 is urged toward the central parts of upper and lower mold members 8, 9. At the same time, the pressure fluid is forced through opening 10 of said slidable annular member 14, tubular workpiece 5, and opening 11 of the other slidable annular member 15, into the space defined between said slidable annular member 15 and inner walls of matched closed ends of upper and lower mold members 8, 9 thereby to urge slidable annular member 15 also toward the central parts of upper and lower mold members 8, 9, thus applying pressures to both ends of tubular workpiece 5. These pressures applied to both ends of workpiece 5 combine with the inner pressure applied by the pressure fluid upon the inner surface of the work to extend and bulge into the cavity or space defined between slidable annular members 14, 15.

Hole 7 for supplying pressure fluid P is formed in annular member 16 that is fitted tightly in open end of the cavity provided by upper and lower mold members 8, 9. Symmetrically with this annular member 16, another annular member 17 is fitted in closed end of the cavity defined by upper and lower mold members 8, 9.

Openings 10, 11 as passages for pressure fluid through slidable annular members 14, 15 are made smaller in diameter than the inner grooves 18, 19 that receive tubular workpiece 5, whereby inner shoulders 20, 21 are formed between openings 10, 11 and inner grooves 18, 19, which shoulders having matching faces to abuttedly support both ends of tubular workpiece 5.

Vent hole 22 is formed in lower mold member 9 at a suitable point between slidable annular members 14, 15. Lands 23, 24 are also formed on inner central parts of upper and lower mold members for restricting bulging of work to predetermined dimensions.

The bulging apparatus of the present invention as above described dispenses with separate pressure-transmitting means as required by conventional apparatus at both ends of upper and lower mold members 8, 9 for connection to pressure fluid sources of different pressures, but it is merely necessary to connect the source of single pressure fluid to only the hole 7 that serves as a passage for the pressure fluid. Thus, the invention renders it possible to simplify the construction of bulging apparatus and rationalize the production equipment.

As described above, the present apparatus operates in such way that pressure fluid urges slidable annular members 14, 15 toward each other thereby to apply pressures to both ends of tubular workpiece 5 and, at the same time, urges cavity faces 12, 13 formed on opposing sides of slidable annular members 14, 15 toward each other, so that the work is bulged smoothly along with and in moderate contact with said cavity faces 12, 13.

Accordingly, application of excessive pressures or forces against the corners Q, Q at the roots of bulge is substantially avoided, and there is no possibility of the bulge 5' being insufficiently extended or made too thin-walled or cracked.

Further, the apparatus of the invention permits the bulging operation to be readily performed by simply forcing a pressure fluid of a predetermined pressure into upper and lower mold members 8, 9 through hole 7, and there is no need of paying so much attention to the pressure regulation as in conventional bulging apparatus. Pressure fluid can be quickly forced into the mold and the work can be bulged within a short period of time, or in about half the time required by ordinary bulging apparatus.

On the apparatus according to the invention it is also possible to form a plurality of bulges 5' simultaneously on a single tubular workpiece 5.

Figure 3:
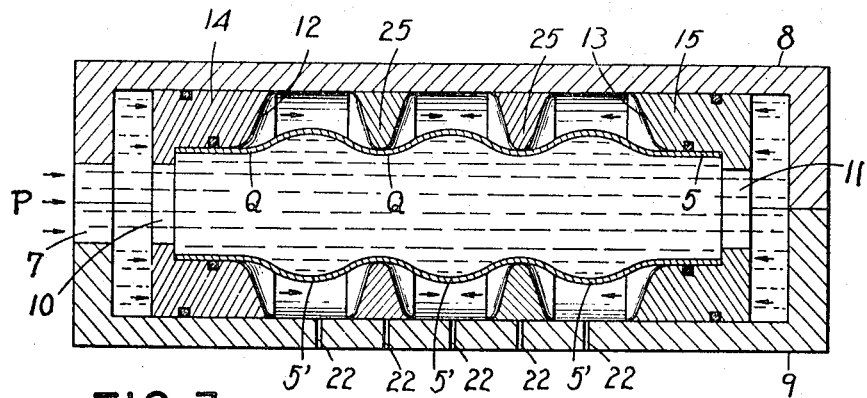
FIG. 3 is a diagrammatic front view, in vertical section, of another embodiment of apparatus of the invention which is adapted to form a tubular body with a plurality of bulges.

In the latter application, a desired number of annular sliding jaws 25 of a desired size and shape are slidably inserted as shown in FIG. 3 between slidable annular members 14, 15 inside upper and lower mold members 8, 9 that are shown in FIGS. 1 and 2, and then hydraulic pressures are applied in the manner already described.

Figure 4:
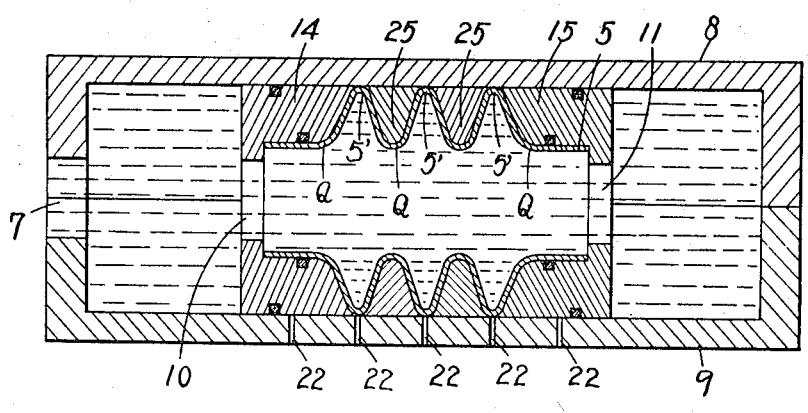
FIG. 4 is a front view, in vertical section, similar to FIG. 3 but showing the completion of molding operation.

Then, displacement under pressure of slidable annular members 14, 15 produces bulges 5' between themselves and sliding jaws 25, one in each pair of annular member and adjacent jaw. In particular, the movement of slidable annular members 14, 15 is followed by corresponding movement of sliding jaws 25 with gradual decrease of spacing until wavy bulges are formed between sliding jaws 25, without the use of any excessive or unreasonable force, as shown in FIG. 4. As will be understood from the difference in hatching in FIGS. 3 and 4, the respective jaw 25 is capable of dividing radially into two jaw elements or more when the bulged tube is removed from the apparatus.

What is claimed is:

1. Apparatus for bulging a tubular workpiece comprises an axially elongated cylindrical hollow mold formed by a pair of semicylindrical mold members secured together to form an axially extending molding chamber; said mold is closed at one end and has an opening in the opposite end for supplying pressurized fluid into said molding chamber, a pair of serially arranged axially extending annular members are disposed within said molding chamber and in sliding relationship with the interior surface of said mold therein, the axial length of said annular members is less than the axial length of said molding chamber, each of said annular members has a first end adjacent one end of the ends of said molding chamber and a second end spaced inwardly within said molding chamber from said first end thereof and the second ends of said annular members are spaced apart, the opening formed by the first ends of said annular members has a diameter less than the diameter of the tubular workpiece to be bulged, the inner surface of each said annular member adjacent its first end has an increased diameter sufficient to receive one end of the tubular member and forms an annular shoulder against which the end of the tubular member bears, the second ends of said annular member diverge outwardly from the part having the increased diameter sufficient to receive the end of the tubular workpiece for forming at least a partial contoured surface for the bulge to be formed, and a vent opening formed through the sides of said mold at a location intermediate its ends so that the vent opening communicates with the part of said molding chamber into which the tubular workpiece is bulged, whereby with a tubular workpiece secured at its ends between said annular members pressurized fluid is introduced through the opening in the end of said mold into said molding chamber so that it flows therethrough to the opposite end of said molding chamber and the pressurized fluid acts on the first ends of said annular members and the interior of the tubular workpiece held by said annular members for bulging the workpiece outwardly intermediate its ends against the contoured surface provided by the second ends of said annular members and for urging said annular members together to assist in the bulging operation.

2. Apparatus, as set forth in claim 1, wherein an annular land is formed on the interior of said mold and extends into said molding chamber intermediate the second ends of said annular members and forms a partial contour surface against which the tubular workpiece is bulged.

3. Apparatus, as set forth in claim 1, wherein a plurality of separate annular sliding jaws are positioned within said molding chamber in sliding contact with the interior surface of said mold, said jaws positioned between the second ends of said annular members and the inwardly directed surfaces of said annular jaws providing a contour against which the tubular workpiece is bulged.

4. Apparatus, as set forth in claim 1, wherein a first annular-shaped insert member is positioned within the open end of said molding chamber and extends for a portion of the axial length thereof, said first insert member having an end wall in contact with the end wall of said molding chamber and a cylindrically-shaped wall extending inwardly from said end wall and in contact with the inner surface of said mold, a second annular-shaped insert member positioned within said molding chamber at the closed end thereof, said second insert member having an end wall in contact with the closed end wall of said molding chamber and a cylindrically-shaped wall extending from said end wall inwardly into said molding chamber and said cylindrically-shaped wall disposed in contact with the inner surface of said mold, the peripheral surfaces of said annular member extending from the first ends thereof being disposed in sliding relationship with the interior surfaces of said first and second insert members, said first and second insert members arranged to facilitate the assembly of the tubular workpiece and the annular members within said molding chamber, and when the pressurized fluid is introduced into said mold, it acts on said annular members between the end wall of said first and second insert members and the oppositely disposed first ends of said tubular members.

References Cited

UNITED STATES PATENTS

| | | | |
|---|---|---|---|
| 2,238,037 | 4/1941 | Cornell | 29—157T |
| 2,372,917 | 4/1945 | Tuttle | 29—421 |
| 2,965,961 | 12/1960 | Schindler et al. | 29—421 |

FOREIGN PATENTS

| | | | |
|---|---|---|---|
| 583,147 | 9/1959 | Canada | 72—62 |
| 590,090 | 1/1960 | Canada | 72—62 |

RICHARD J. HERBST, Primary Examiner

U.S. Cl. X.R.

29—421